United States Patent [19]

Morita et al.

[11] Patent Number: 4,661,377

[45] Date of Patent: Apr. 28, 1987

[54] PROCESS FOR PRODUCING A MAGNETIC RECORDING MEDIUM HAVING AN IMPROVED DIMENSIONAL STABILITY

[75] Inventors: Kazuhiko Morita; Shigeo Komine; Akira Kasuga; Noburo Hibino, all of Kanagawa, Japan

[73] Assignee: Fuji Photo Film Co., Ltd., Kanagawa, Japan

[21] Appl. No.: 569,887

[22] Filed: Jan. 11, 1984

[30] Foreign Application Priority Data

Jan. 12, 1983 [JP] Japan ................................. 58-2282

[51] Int. Cl.$^4$ ............................................. H01F 10/02
[52] U.S. Cl. ................................. 427/130; 427/290; 427/293; 427/379
[58] Field of Search ............................ 427/127–130, 427/48, 290, 293, 379

[56] References Cited

U.S. PATENT DOCUMENTS

| | | | |
|---|---|---|---|
| 3,473,960 | 10/1969 | Jacobson et al. | 427/130 |
| 3,676,216 | 7/1972 | Abitboul | 427/289 |
| 4,100,326 | 7/1978 | Somezawa et al. | 427/130 |

FOREIGN PATENT DOCUMENTS 2461201 10/1975 Fed. Rep. of Germany .

*Primary Examiner*—Bernard D. Pianalto
*Attorney, Agent, or Firm*—Sughrue, Mion, Zinn, Macpeak, and Seas

[57] ABSTRACT

A heat-treating process is disclosed. The process involves cutting a polymer support for a recording medium from a web roll of a long support base into a sheet form. The sheet or sheets in a superposed state are then heat-treated while applying pressure in the range of 1 g/cm$^2$ to 1 kg/cm$^2$ at a temperature of 50° C. to 150° C. for a period of time of 15 seconds to 24 hours. The heat treating process avoids conventional problems with respect to thermal shrinkage.

30 Claims, No Drawings

PROCESS FOR PRODUCING A MAGNETIC RECORDING MEDIUM HAVING AN IMPROVED DIMENSIONAL STABILITY

FIELD OF THE INVENTION

This invention relates to a process for producing a magnetic recording medium. More specifically, the invention relates to a process for producing a sheet-form recording medium such as a floppy disc, having an improved dimensional stability.

BACKGROUND OF THE INVENTION

A magnetic recording medium using a polymer support is advantageous in that the recording medium has a proper flexibility and the roughness of the surface can be properly controlled. However, such a support can cause changes due to thermal shrinkage.

The thermal shrinkage means an irreversible dimensional change occurring when using, preserving, or transporting a magnetic recording medium in a high temperature atmosphere.

When the dimensional change occurs between recording and reproducing, a tracking discrepancy occurs reducing reproduction output and, in an extreme case, makes reproduction impossible.

SUMMARY OF THE INVENTION

As the result of various investigations in solving the foregoing problems of thermal shrinkage, it has now been found that a sheet-form magnetic recording medium having an improved dimensional stability can be obtained by cutting a polymer support from a web roll of the long support into sheet forms before or after forming a magnetic recording layer on the polymer support and heat-treating the support sheets under pressure.

That is, according to the present invention, there is provided a process of producing a sheet-form magnetic recording medium comprising a polymer support having formed thereon a magnetic recording layer, which comprises cutting the polymer support from a web roll of the long support into sheet forms before or after forming a magnetic recording layer on the support and heat-treating the support sheets under pressure.

DETAILS DESCRIPTION OF THE PREFERRED EMBODIMENTS

Any polymer supports which are conventionally used in magnetic recording media can be used in this invention, and polyethylene terephthalate film is preferred for the purpose. By the term "a web roll of the long support" in this invention is meant a web base before coating a magnetic recording layer or a web base after coating thereon a magnetic recording layer or further the web base having a magnetic recording layer, which is further subjected to an additional treatment such as calender treatment. That is, in the case of the uncoated web base, a magnetic layer may be formed on the web base after or before the heat treatment by spin coating, sheet-fed press coating, etc. However, the coated web base is preferably used.

Also, the term "sheet-form" in this invention includes a square form, a circular or disc form, and other optional forms, preferably circular or disc form. When the final product of the magnetic recording medium is a disc-form recording medium such as a floppy disc, etc., the circular or disc-form product may have a hole at the center and such a product may be fabricated before or after the heat-treatment.

When a polymer support or film is heat-treated, it causes thermal shrinkage. Accordingly, the support may be fabricated before the heat treatment by considering the shrinkage which will occur during the heat treatment so that the sheet will become the desired dimensions of the final product after the heat treatment. Furthermore, by considering the difference in thermal shrinkage percentage between the longitudinal direction and the width direction of a web base, the dimensions of the web base before the heat treatment may be aset by considering the shrinkage percentages.

Moreover, when the dimensional precision of the central hole of a magnetic recording medium as the final product is more important than that of the outside diameter of the medium, the central hole may be formed after heat treatment. Also, as a matter of course, the polymer support sheets having a slightly larger size than that of the final product are heat-treated and the heat-treated sheets may then be formed into the desired size.

The heat treatment in this invention is performed by placing a support sheet or plural support sheets in a superposed state between two parallel plates while applying a pressure of 1 g/cm$^2$ to 1 kg/cm$^2$ to the sheet(s) between the plates. If the pressure is lower than 1 g/cm$^2$, the flatness of the sheet(s) thus heat treated is reduced, while if the pressure is higher than 1 kg/m$^2$, the support sheet(s) are restricted, whereby the thermal shrinkage is not sufficiently removed. To facilitate the movement in the direction of the sheet plane during heat treatment, many perforations may be formed in the press plate. Pressure may be applied to the sheet(s) by a fluid such as air, oil, etc.

It is preferred that the heating temperature for the heat treatment be 50° C. to 150° C. If the temperature is below 50° C., it takes a long period of time to perform the heat treatment, while if the temperature is above 150° C. the flatness of the support sheets is reduced. When performing the heat treatment at temperatures of 100° C. to 150° C., it is preferable to release the support sheet(s) thus heat treated after cooling below about 50° C. Also, it is preferred that the heating period be 15 seconds to 24 hours. In addition, the press plates may be curved for the removal of curling.

The following examples are intended to illustrate the present invention but not to limit the invention in any way.

EXAMPLE 1

A magnetic liquid having the following composition was coated on both surfaces of a polyethylene terephthalate film support (about 70 microns thick) at a dry thickness of 4 microns and dried to form magnetic layers on both surfaces.

| | |
|---|---|
| $\gamma$-Fe$_2$O$_3$ | 300 parts by weight |
| PVC-Ac (VYHH, Trade name, made by Union Carbide Corporation) | 40 parts by weight |
| Epoxy resin (Epikote 1001, trade name, made by Shell Chemical Co.) | 40 parts by weight |
| Polyamide (Versamide 115, trade name, made by General Motors Co.) | 20 parts by weight |
| Methyl isobutyl ketone/xylol | 800 parts by weight |

After calender treatment, square sheets each of 9 inch×9 inch in area were formed from the coated support. Then, 100 sheets were piled, placed between smooth chromium-plated iron plates, and the sheets were maintained in that state for 3 hours at 80° C. while applying a pressure of 5 kg (9.6 g/cm$^2$) to the sheets.

After the heat treatment, a disc 8 inches in diameter was cut from the square sheet to provide a floppy disc. After recording the floppy disc thus prepared it was placed in an atmosphere of 40° C. and 80% RH and run for 1,000 hours. After dismounting the floppy disc, the diameter of the outermost track was measured. It was confirmed that the maximum shrinkage (assumed to be in the longitudinal direction of the support) was 3 microns and the minimum shrinkage (assumed to be in the width direction of the support) was 2 microns.

A floppy disc having the same diameter as above was cut from the foregoing square sheet without being heat-treated. When the diameter of the outermost track of the floppy disc was measured after running the disc as above described, the maximum shrinkage was 80 microns and the minimum shrinkage was 68 microns.

EXAMPLE 2

By considering the shrinkages confirmed in Example 1, a floppy disc was cut from a magnetic recording sheet prepared in the same manner as in Example 1 before heat-treating the magnetic recording sheet in the dimensions of a circular form by setting the shrinking percentage at 0.25% in the MD direction (the longitudinal direction of the support) and 0.15% in the TD direction (the width direction of the support). The discs were then heat treated as in Example 1. After the heat treatment, the same test as in Example 1 was applied to the floppy disc using the same floppy disc device as used in the same example but no abnormality was observed on positioning, etc.

EXAMPLE 3

A magnetic liquid having the following composition was coated on a balance-type polyethylene terephthalate film support (28 microns thick) to a dry thickness of 2.5 microns and dried.

| | |
|---|---|
| Fe-Co metal magnetic powder | 300 parts by weight |
| Nitrocellulose | 30 parts by weight |
| Urethane resin (Esthine 5701, trade name, made by Goodrich Co.) | 20 parts by weight |
| Hardening agent (Desmodur L-75, trade name, made by Bayer A.G.) | 22 parts by weight |
| Buthyl acetate/methyl isobutyl ketone (2/1) | 900 parts by weight |

Floppy discs having a diameter of 2 inches were cut from the magnetic recording sheet thus prepared while setting the shrinking percentages as in Example 2 and 500 such discs were heat treated as in Example 1 for 10 hours at 85° C. while applying the pressure of a 3 Kg load. Then, when the discs were allowed to stand for 4 hours at 60° C. and the thermal shrinkages were measured, the shrinkage in the MD direction was 0.01% and that in the TD direction was substantially 0%.

For comparison, a disc was prepared in the same manner as above except the heat treatment was not carried out. The thermal shrinkages were measured, and the shrinkage in the MD direction was 0.15% and that in the TD direction was 0.11%.

While the invention has been described in detail and with reference to specific embodiments thereof, it will be apparent to one skilled in the art that various changes and modifications can be made therein without departing from the spirit and scope thereof.

What is claimed is:

1. A heat-treating process, comprising the steps of:
   cutting a polymer support base for a recording medium from a web roll of a long support base into a sheet form; and
   heat-treating the sheet form under pressure, whereby said sheet form exhibits improved dimensional stability, the heat-treating being carried out at a temperature in the range of 50° C. to 150° C. under a pressure in the range of 1 g/cm$^2$ to 1 kg/cm$^2$, wherein the polymer support base is polyethylene terephthalate.

2. A heat-treating process as claimed in claim 1, further comprising the step of:
   coating a magnetic recording layer on the sheet form after the heat-treating.

3. A heat-treating process as claimed in claim 2, wherein said magnetic recording layer comprises a polymeric binder and magnetic particles.

4. A heat-treating process as claimed in claim 2, wherein the magnetic recording layer remains on the sheet form.

5. A heat-treating process as claimed in claim 1, further comprising the step of:
   coating a magnetic recording layer on the sheet form after the cutting and prior to the heat-treating.

6. A heat-treating process as claimed in claim 3, wherein said magnetic recording layer comprises a polymeric binder and magnetic particles.

7. A heat-treating process as claimed in claim 5, wherein the magnetic recording layer is dried prior to the heat-treating.

8. A heat-treating process as claimed in claim 1, further comprising the step of:
   coating a magnetic recording layer on the polymer support base prior to the cutting.

9. A heat-treating process as claimed in claim 8, wherein said magnetic recording layer comprises a polymeric binder and magnetic particles.

10. A heat-treating process as claimed in claim 8, wherein the magnetic recording layer remains on the polymer support base.

11. A heat-treating process as claimed in claim 8, wherein the magnetic recording layer is dried prior to the cutting and prior to the heat-treating.

12. A heat-treating process as claimed in claim 1, wherein the pressure is applied by two plates between which the sheet form is placed.

13. A heat-treating process as claimed in claim 1, wherein the sheet form is in disc-form.

14. A heat-treating process as claimed In claim 1, wherein the heat-treating is between two heated metal plates.

15. A heat-treating process as claimed in claim 1, wherein the sheet form is a square form or a circular form.

16. A heat-treating process as claimed in claim 1, wherein the sheet form has a size slightly larger than that of the final product desired.

17. A heat-treating process as claimed in claim 1, wherein the sheet form is square and 9 inches×9 inches in dimension.

18. A heat-treating process, comprising the steps of:
cutting a polymer support base for recording medium from a web roll of a long support base into a sheet form; and
heat-treating the sheet form, the heat-treating being carried out at a temperature in the range of 50° C. to 150° C. under a pressure in the range of 1 g/cm$^2$ to 1 kg/cm$^2$ for a period of time in the range of 15 seconds to 24 hours, and wherein said polymer support base is polyethylene terephthalate.

19. A heat-treating process as claimed in claim 18, further comprising the step of:
coating a magnetic recording layer on the sheet form after the heat-treating.

20. A heat-treating process as claimed in claim 19, wherein said magnetic recording layer comprises a polymeric binder and magnetic particles.

21. A heat-treating process as claimed in claim 18, further comprising the step of:
coating a magnetic recording layer on the sheet form after the cutting and prior to the heat-treating.

22. A heat-treating process as claimed in claim 21, wherein said magnetic recording layer comprises a polymeric binder and magnetic particles.

23. A heat-treating process as claimed in claim 21, wherein the magnetic recording layer is dried prior to the heat-treating.

24. A heat-treating process as claimed in claim 18, further comprising the step of:
coating a magnetic recording layer on the polymer support base prior to the cutting.

25. A heat-treating process as claimed in claim 24, wherein said magnetic recording layer comprises a polymeric binder and magnetic particles.

26. A heat-treating process as claimed in claim 24, wherein the magnetic recording layer is dried prior to the cutting and prior to the heat-treating.

27. A heat-treating process as claimed in claim 18, wherein the heat-treating is between two heated metal plates.

28. A heat-treating process as claimed in claim 18, wherein the sheet form is a square form or a circular form.

29. A heat-treating process as claimed in claim 18, wherein the sheet form has a size slightly larger than that of the final product desired.

30. A heat-treating process as claimed in claim 18, wherein the sheet form is square and 9 inches×9 inches in dimension.

* * * * *